Patented Aug. 11, 1936

2,050,924

UNITED STATES PATENT OFFICE 2,050,924

PROCESS FOR BREAKING PETROLEUM EMULSIONS

Melvin De Groote, St. Louis, Mo., assignor to Tretolite Company, Webster Groves, Mo., a corporation of Missouri No Drawing. Application November 14, 1935, Serial No. 49,763

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion to the action of a treating agent comprising a water-soluble surface-active material of the cation-active type, of the kind hereinafter described.

Surface-active substances may be defined as compounds, which, when dissolved in water, lower the interfacial free energy between the water and one or more of its neighboring phases, and in addition, are present at higher concentrations at the interface than in the bulk of the solution; while also they are frequently arranged in a more or less definitely oriented arrangement. The solution or sol thus obtained usually possesses marked frothing or foaming properties, and also usually the ability to produce oil-in-water emulsions. Such sol or solution has strong wetting properties and sometimes detergent properties.

Although there are many such surface-active materials, especially of the anion-active type, only certain ones have found application in the art of breaking petroleum emulsions. Incidentally, many substances have found application in the art of breaking petroleum emulsions which are devoid of surface-active properties when measured by the usual criteria. For this reason, as well as other reasons, surface-activity alone is not an index of demulsifying power.

The type of surface-active materials conventionally employed in breaking petroleum emulsions are such materials as soaps, resinates, naphthenates, salts of petroleum sulfonic acids, salts of fatty sulfates, salts of fatty sulfonates, salts of fatty sulfo-aromatic acids, di-alkyl sulfates, salts of alkylated naphthalene sulfonic acids, and salts of similar nuclear substituted naphthalene sulfonic acids and the like. Although these substances may be used in the form of acids or esters, ammonium salts, amine salts, sodium salts, etc., they are more commonly used in the form of a simple salt, on account of economy and freedom of corrosion. For the sake of simplicity, such materials may be expressed by the formula: X.TNa where X represents an aliphatic chain, a non-aromatic cyclic ring, or a substituted aromatic or hydro-aromatic nucleus, T represents an acid residue, such as a COO radical, an $SO_3$ radical derived from the conventional sulfonic acid radical, or an $SO_4$ radical derived from an acid sulfate radical. Specific examples are: sodium oleate, sodium resinate, sodium naphthenate, sodium salt of oleic acid hydrogen sulfate, sodium salt of sulfo-ricinoleic acid, sodium salt of sulfo-benzene stearic acid, cetyl sodium sulfonate, sodium salts of sulfo-aromatic esters of fatty acids, sodium salts of sulfo-aliphatic esters of fatty acids, etc.

All these materials are characterized by the fact that in solution, they ionize so as to give a sodium ion with a positive charge and an (X.T) ion having a negative charge. In a case of sodium oleate, of course, one obtains the sodium ion with a positive charge, and an oleate ion with a negative charge.

It is to be noted that in all these instances, it is not the sodium atom or the sodium ion which gives the characteristic surface-active properties, but it is the remainder of the molecule, that is, the radial, which has been denoted as the (X.T) radical. The (X.T) radical contributes the anion, and thus all the previously described surface-active materials may be considered as being anion-active.

I have found that certain surface-active substances which are cation-active are effective demulsifying agents for petroleum emulsions. Such surface-active substances can be produced in various ways, such, for example, as by reaction between a heterocyclic nucleus containing nitrogen in the ring, such as pyridine, picoline, or quinoline, or their homologues, with higher alkyl halides. These halides can be prepared from alcohols in the usual manner, and the alcohols in turn may be obtained from fatty acid or by the hydrolysis of waxes or the like. Available alcohols for this purpose are: hexadecyl alcohol, stearyl alcohol, octyl alcohol, oleyl alcohol, lauryl alcohol, palmityl alcohol, etc. It is necessary that at least one alkyl group, which is combined to form the molecule constituting the surface-acting material contain at least 8 carbon atoms and not more than 26 carbon atoms. Examples of such materials are: cetyl pyridium bromide ($C_{16}H_{33}BrNC_5H_5$). Similarly, stearyl pyridium bromide is a suitable material. Stearyl alpha-picolinium bromide may be employed. (See British Patent No. 379,396, dated September 1, 1932, to the Imperial Chemical Industries, Ltd.)

These materials represent a type of quaternary ammonium salts and are commonly available in the form of chlorides, bromides, or iodides. Since the surface-active effect cannot be due to the chloride or bromide ion, it is obviously due to the cation, which represents a cetyl pyridinium radical, stearyl pyridinium radical, duodecyl pyridinium radical, stearyl picolinium radical, duodecyl picolinium radical, etc. Such cations, of course, carry a positive charge, and solutions of such materials as cetyl pyridinium chloride would be expected to charge the adsorbed surfaces positively, or else to neutralize negative charges.

Similar substances include other quaternary ammonium salts which are derived from the ammonium radical. The pyridinium radical represents a particular species of the substituted ammonium radical. For instance, trimethyl copryl ammonium chloride may be used. In other words, one may use any surface-active water-soluble substituted quaternary ammonium salt, provided that one of the radicals substituted for one of the hydrogens of the ammonium radical is a hydrocarbon group having at least 8 carbon atoms and not more than 26 carbon atoms in the hydrocarbon chain. Trimethyl cetyl ammonium chloride may be employed; trimethyl stearyl ammonium chloride may be used; trimethyl duodecyl ammonium chloride is suitable, trimethyl lauryl ammonium chloride is effective.

Thus, the surface-active material used as a demulsifying agent in the present process may be described as being of the type:

in which Z represents any hydrocarbon radical having at least 8 and not more than 26 carbon atoms; A represents a substituent radical for another hydrogen atom of the ammonium radical, and may be a methyl radical, ethyl radical, etc., or AAA may be replaced by a single trivalent radical, such as a pyridine, picoline, or quinoline residue. X represents a non-surface-active component or anion, such as a chlorine or bromine atom or ion.

As previously stated, the most desirable type of reagent is derived from pyridine or its homologues, and thus would be indicated by the formula: $Z.N.C_5H_5.X$.

The reagent which I prefer to use is cetyl pyridinium bromide, and it is obtained by heating 31 parts of cetyl (hexadecyl) bromide with 8 parts of pyridine at 140–150° C., until a sample solidifies on cooling and is completely soluble in water. The composition of this preferred reagent may be expressed by the formula: $C_{16}H_{33}N.C_5H_5.Br$.

Recently there have been available alcohols derived from naphthenic acids, instead of fatty acids. Such alcohols can be converted into halides, and such naphthenyl halides could be used to replace a duodecyl bromide, octadecyl bromide, and the like, in reactions with pyridine, or its homologues. Materials so obtained would show markedly greater solubility in oil than similar materials derived from fatty acid compounds, even though they would still show valuable surface-active properties when dissolved in water.

The specific form, state, or condition of the treating agent at the time it is used or applied to the emulsion to be treated is immaterial and may be varied to suit existing conditions. It can be used in substantially anhydrous state or in solutions of any convenient strength. The treating agent may be diluted with any suitable solvent, such as ethyl alcohol, methyl alcohol, isopropyl alcohol, butyl alcohol, kerosene, or any other hydrocarbon solvent, benzol, xylene, solvent, naphtha, carbon tetrachloride, pine oil, etc.

These materials may be employed alone or in combination with other recognized demulsifying agents, such as water softeners, modified fatty acids, salts of petroleum sulfonic acids, alkylated aromatic sulfonic acids, derivatives of polybasic carboxy acids, and the like.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature of about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kind known as "tank bottoms", and "residual pit oils", the ratio of 1:500, above referred to, may be required. In treating fresh emulsions, i. e., emulsions that will yield readily to the action of chemical emulsifying agents, the ratio of 1:30,000, above referred to, may be sufficient to produce highly satisfactory results.

In general, I have found that for an average petroleum emulsion, a ratio of 1 part of treating agent to 10,000 parts of emulsion will usually be found to produce commercially satisfactory results.

Having thus described my invention, what I now claim and desire to secure by Letters Patent is:

1. A process for breaking petroleum emulsions of the water-in-oil type, which consists in subjecting the emulsion to the action of a water-soluble, cation-active, surface-active substance of the formula type:

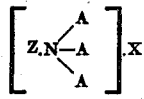

in which Z represents any aliphatic hydrocarbon radical having at least 8 and not more than 26 carbon atoms; A represents a substituent radical to replace a hydrogen atom of the ammonium radical, and may be a methyl radical, ethyl radical, etc., or AAA may be replaced by a single trivalent radical, such as a pyridine, picoline, or quinoline residue, and X represents a non-surface-active negative radical or component.

2. A process for breaking petroleum emulsions of the water-in-oil type, which consists in subjecting the emulsion to the action of a demulsifying agent of the formula type: $Z.NC_5H_5.X$ in which Z represents any aliphatic hydrocarbon radical having at least 8 and not more than 26 carbon atoms, and X represents a non-surface-active negative radical or component.

3. A process for breaking petroleum emulsions of the water-in-oil type, which consists in subjecting the emulsion to the action of a demulsifying agent of the formula type: $Z.NC_5H_5.X$ in which Z represents any aliphatic hydrocarbon radical having at least 8 and not more than 26 carbon atoms, and X represents a non-surface-active negative halogen component.

4. A process for breaking petroleum emulsions of the water-in-oil type, which consists in subjecting the emulsion to the action of a demulsifying agent of the formula type: $Z.NC_5H_5.Br$ in which Z represents any aliphatic hydrocarbon radical having at least 8 and not more than 26 carbon atoms.

5. A process for breaking petroleum emulsions of the water-in-oil type, which consists in subjecting the emulsion to the action of a demulsifying agent containing cetyl pyridinium bromide.

6. A process for breaking petroleum emulsions of the water-in-oil type, which consists in subjecting the emulsion to the action of a demulsifying agent containing octadecyl pyridinium bromide.

7. A process for breaking petroleum emulsions of the water-in-oil type, which consists in subjecting the emulsion to the action of a demulsifying agent containing stearyl alpha-picolinium bromide.

MELVIN DE GROOTE.